United States Patent [19]

Koide et al.

[11] Patent Number: 4,854,414
[45] Date of Patent: Aug. 8, 1989

[54] ELECTRIC CONTROL APPARATUS FOR TRANSFER DEVICE IN PART-TIME FOUR-WHEEL DRIVE VEHICLE

[75] Inventors: Toshikazu Koide; Shuichiro Ida; Toshio Yoshinaka; Shuji Nagano; Shoji Haga, all of Toyota, Japan

[73] Assignee: Toyota Jidosha Kabushiki Kaisha, Toyota, Japan

[21] Appl. No.: 78,990

[22] Filed: Jul. 29, 1987

[30] Foreign Application Priority Data

Jul. 29, 1986 [JP] Japan .......................... 61-116141[U]
Jul. 29, 1986 [JP] Japan .......................... 61-116142[U]
Jul. 29, 1986 [JP] Japan .......................... 61-116143[U]

[51] Int. Cl.$^4$ .................................................. B60K 17/34
[52] U.S. Cl. ...................................... 180/249; 180/197; 180/233; 180/247
[58] Field of Search ................ 180/247, 248, 249, 197

[56] References Cited

U.S. PATENT DOCUMENTS

4,433,748  2/1984  Satoh et al. ........................ 180/247
4,560,025  12/1985  Suzuki et al. ...................... 180/247
4,621,707  11/1986  Fukuhara et al. ................... 180/247

Primary Examiner—Charles A. Marmor
Assistant Examiner—Donn McGiehan
Attorney, Agent, or Firm—Oblon, Spivak, McClelland, Maier & Neustadt

[57] ABSTRACT

An electric control apparatus for a transfer device in a part-time four-wheel drive vehicle is arranged to permit switchover of the transfer device from the two-wheel drive mode to the four-wheel drive mode when a difference in rotational speed between front and rear propeller shafts is smaller than a predetermined value and to prohibit switchover of the transfer device from the two-wheel drive mode to the four-wheel drive mode when the difference in rotational speed between the front and rear propeller shafts is larger than the predetermined value.

6 Claims, 6 Drawing Sheets

ELECTRIC CONTROL APPARATUS FOR TRANSFER DEVICE IN PART-TIME FOUR-WHEEL DRIVE VEHICLE

BACKGROUND OF THE INVENTION

1. Field of the Invention

The present invention relates to an electric control apparatus for a transfer device in part-time four-wheel drive vehicles, the transfer device being arranged to be operated by the driver to alternately provide a two-wheel drive mode or four-wheel drive mode of operation for the vehicle.

2. Discussion of the Background

In Japanese Patent Early Publication No. 59-216732, there has been proposed a transfer device of this kind which includes an input shaft driven by a power transmission and two output shafts, one of the output shafts being drivingly connected to the input shaft for continuously driving one set of rear road wheels through a rear propeller shaft, a rear differential and split axle parts, and the other output shaft being connectable to the input shaft by a clutch mechanism in the transfer device for selectively driving a set of front road wheels through a front propeller shaft, a front differential and split axle parts. In the transfer device, a two-wheel drive mode is provided by disengagement of the clutch mechanism, and a four-wheel drive mode is provided by engagement of the clutch mechanism. In such a part-time four-wheel drive system, conventional hub locks are used in connection with the front road wheels to disconnect the wheels from their associated split axle parts when the two-wheel drive mode is selected at the transfer device. This is effective to eliminate back drive of the split axle parts, differential and propeller shaft for the non-driven front road wheels.

Assuming that the vehicle is travelling at a mid or high speed under unlocked condition of the hub locks in the two-wheel drive mode, the split axle parts, differential and propeller shaft for the non-driven front road wheels are still, while the split axle parts, differential and propeller shaft for the rear road wheels are driven at a mid or high speed. If the clutch in the transfer device is engaged to select the four-wheel drive mode during such mid or high speed travel of the vehicle, drive connection between the input shaft and the non-driven output shaft for the front propeller shaft will cause a great impact acting on the transfer device. This causes unpleasant shocks, noises and unexpected damage of component parts in the transfer device. To solve such problems, the driver is obliged to select the four-wheel drive mode at the transfer device only when the vehicle is stopping. This results in inconvenience for the vehicle driver and deteriorates the merit of the part-time four-wheel drive system.

SUMMARY OF THE INVENTION

It is, therefore, a primary object of the present invention to provide an electric control apparatus for the transfer device in which a difference in rotational speed between the front and rear propeller shafts is detected to permit selection of the four-wheel drive mode at the transfer device during travel of the vehicle in the two-wheel drive mode without causing such unpleasant shocks, noises and unexpected damage of component parts in the transfer device as described above.

Another object of the present invention is to provide an electric control apparatus for the transfer device in which rotational speed of the rear propeller shaft or travel speed of the vehicle is detected to permit selection of the four-wheel drive mode at the transfer device during low speed travel of the vehicle in the two-wheel drive mode.

A further object of the present invention is to provide an electric control apparatus for the transfer device in which rotational speed of the front propeller shaft is detected to permit selection of the four-wheel drive mode at the transfer device when the hub locks have been locked during travel of the vehicle in the two-wheel drive mode.

A still another object of the present invention is to provide an electric control apparatus for the transfer device in which the position of the clutch mechanism is detected at start of a prime mover of the vehicle to retain the clutch mechanism in the position defined by prior operation of the transfer device thereby to eliminate unexpected change of the prior mode of operation of the transfer device.

A still further object of the present invention is to provide an electric control apparatus for the transfer device in which a manual operation switch of the momentary contact type is provided to effect switchover of the transfer device to the four-wheel drive mode only when it is operated in a condition where selection of the four-wheel drive mode is permitted thereby to eliminate unexpected change of the mode of operation of the transfer device, and in which indication means is provided to visually inform the drive of the fact that the selection of the four-wheel drive mode is prohibited during travel of the vehicle in the two-wheel drive mode.

According to the present invention, there is provided an electric control apparatus for a transfer device united with a power transmission and including an input shaft driven by the transmission, a first output shaft drivingly connected to the input shaft for continuously driving a first set of road wheels through a first propeller shaft, a first differential and split axle parts, a second output shaft connectable to the input shaft and drivingly connected to a second set of road wheels through a second propeller shaft, a second differential and split axle parts, and a clutch mechanism shiftable between a first position where it is disengaged to disconnect the second output shaft from the input shaft thereby to provide a two-wheel drive mode and a second position where it is engaged to connect the second output shaft to the input shaft thereby to provide a four-wheel drive mode. The electric control apparatus comprises a manual operation switch of the momentary contact type for selecting the two-wheel drive or the four-wheel drive mode at the transfer device, switchover means arranged to be activated in response to operation of the operation switch for shifting the clutch mechanism from the first position to the second position, first detecting means for detecting rotational speed of the first propeller shaft to produce a first speed signal indicative of the rotational speed of the first propeller shaft, second detecting means for detecting rotational speed of the second propeller shaft to produce a second speed signal indicative of the rotational speed of the second propeller shaft, and control means in the form of a microcomputer responsive to operation of the operation switch and the speed signals for permitting activation of the switchover means when a difference in rotational speed between the first and second propeller shafts is smaller than a predetermined value and for prohibiting activation of the switchover means when the difference in rotational speed between the first and second propeller shafts is larger than the predetermined value.

In a preferred embodiment of the present invention, the switchover means includes a pneumatic actuator in the form of a vacuum motor operatively connected to a clutch sleeve of the clutch mechanism, and electrically operated switchover valve means interposed between the vacuum motor and a negative pressure source and arranged to be activated under control the control means for switching over a negative pressure applied to the vacuum motor from the negative pressure source.

It is preferable that the electric control apparatus comprises a manual operation switch of the momentary contact type for selecting the two-wheel drive mode or the four-wheel drive mode at the transfer device, switchover means arranged to be activated in response to operation of the operation switch for switching over the clutch mechanism from the first position to the second position, first detecting means for detecting rotational speed of the first propeller shaft to produce a first speed signal indicative of the rotational speed of the first propeller shaft, second detecting means for detecting rotational speed of the second propeller shaft to produce a second speed signal indicative of the rotational speed of the second propeller shaft, third detecting means for detecting the position of said clutch mechanism to produce a position signal indicative of the position of the clutch mechanism, control means in the form of a microcomputer responsive to operation of the operation switch, the speed signals and the position signal for permitting activation of the switchover means only when the operation switch is operated in a condition where the clutch mechanism is in the first position and where the rotational speed of the first propeller shaft is lower than a predetermined speed or in a condition where the clutch mechanism is in the first position and where the rotational speed of the second propeller shaft is substantially equal to the rotational speed of the first propeller shaft and for prohibiting activation of the switchover means in a condition where the rotational speed of the first propeller shaft is higher than the predetermined speed and where the rotational speed of the second propeller shaft is lower than the rotational speed of the first propeller shaft, and indication means for visually informing the driver of the fact that activation of the switchover means is prohibited under control of the computer.

Alternatively, it is further preferable that the electric control apparatus comprises a manual operation switch of the momentary contact type for selecting the two-wheel drive or the four-wheel drive mode at the transfer device, switchover means arranged to be activated in response to operation of the operation switch for switching over the clutch mechanism from the first position to the second position, first detecting means for detecting rotational speed of the first propeller shaft to produce a speed signal indicative of travel speed of the vehicle, second detecing means for detecting the position of the clutch mechanism to produce a position signal indicative of the position of the clutch mechanism, and control means in the form of a microcomputer responsive to operation of the operation switch and the speed signal for permitting activation of the switchover means only when the operation switch is operated in a condition where the travel speed of the vehicle is lower than a predetermined speed and for prohibiting activation of the switchover means in a condition where the travel speed of the vehicle is higher than the predetermined speed, the computer being arranged to memorize a position of the clutch mechanism defined by prior operation of the transfer device and being further responsive to start of a prime mover of the vehicle and the position signal for activating the switchover means in such a manner as to retain the clutch mechanism in the memorized position.

BRIEF DESCRIPTION OF THE DRAWINGS

Additional objects, features and advantages of the present invention will be readily appreciated from the following detailed description of a preferred embodiment thereof when considered with reference to the accompanying drawings, in which.

DESCRIPTION OF THE PREFERRED EMBODIMENT

Figure 1:
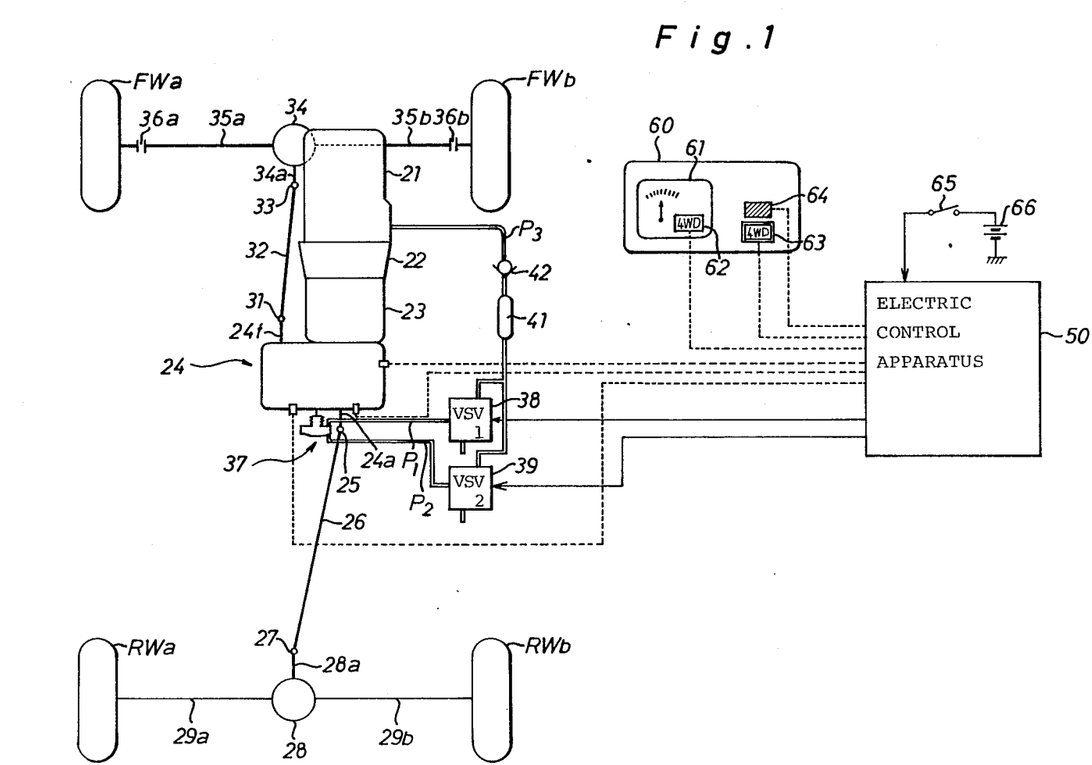
FIG. 1 is a schematic illustration of a part-time four-wheel drive vehicle equipped with a transfer device to be controlled by an electric control apparatus in accordance with the present invention.
Figure 2:
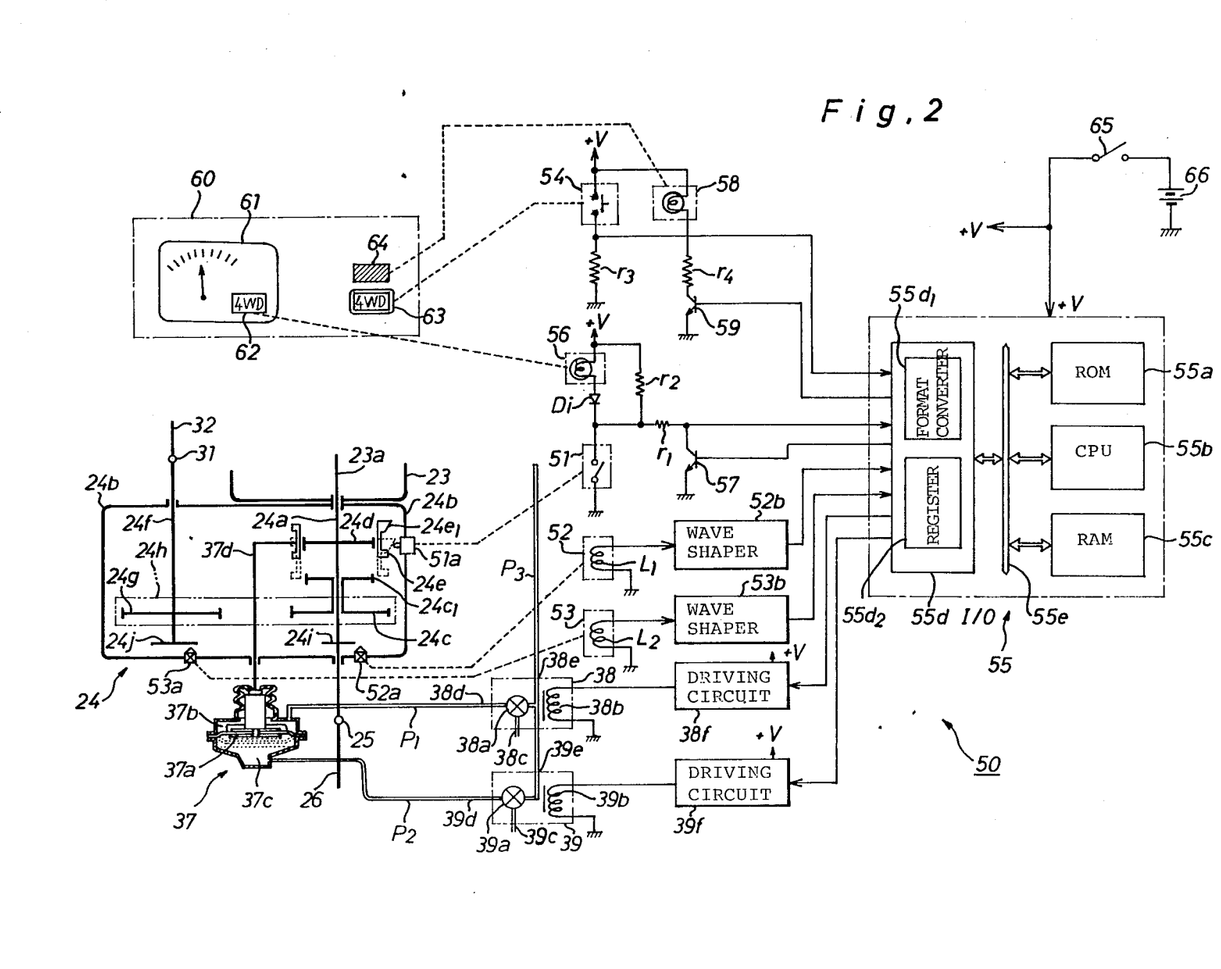
FIG. 2 is a schemative illustration of component parts of the transfer device and a circuit diagram of the electric control apparatus.

Referring now to the drawings, in particular to FIG. 1, there is schematically illustrated a part-time four-wheel drive vehicle which comprises an internal combustion engine 21 mounted on the front portion of a vehicle body structure, a power transmission 23 attached to the rear end of engine 21 through a clutch mechanism 22, and a transfer device 24 united with the power transmission 23. As shown in FIG. 2, the transfer device 24 includes an input shaft 24a rotatably mounted within a housing 24b and drivingly connected to an output shaft 23a of power transmission 23 to transfer the power to a set of rear road wheels RWa and RWb. The input shaft 24a is provided thereon with a drive sprocket 24c which is integrally provided with an externally splined clutch hub $24c_1$ and is arranged for relative rotation to the input shaft 24a. An externally splined clutch hub 24d is mounted on the input shaft 24a for rotation therewith, and an internally splined clutch sleeve 24e is slidably mounted on the clutch hub 24d. The clutch sleeve 24e is shiftable between a first position where it is disengaged from the clutch hub $24c_1$ and a second position where it couples the clutch hubs 24d and $24c_1$. The clutch sleeve 24e is arranged to be shifted by a vacuum motor 37 as will be described later.

The transfer device 24 further includes an output shaft 24f arranged in parallel with the input shaft 24a and rotatably mounted within the housing 24b to transfer the power from input shaft 24a to a set of front steerable road wheels FWa and FWb. A driven sprocket 24g is mounted on the output shaft 24f for rotation therewith and connected to the drive sprocket 24c through a drive chain 24h to be driven by rotation of the drive sprocket 24c. The input shaft 24a is drivingly connected at its rear end 25 to a rear propeller shaft 26 which in turn is drivingly connected at its rear end 27 to an input shaft 28a of a rear differential 28. The rear differential 28 is drivingly connected to the rear road wheels RWa and RWb through a pair of split axle parts 29a and 29b to transfer the power from input shaft 24a of the transfer device 24 to the rear road wheels therethrough. The output shaft 24f is drivingly connected at its front end 31 to a front propeller shaft 32 which in turn is drivingly connected at its front end 33 to an input shaft 34a of a front differential 34. The front differential 34 is drivingly connected to the front steerable road wheels FWa and FWb through a pair of split axle parts 35a and 35b.

A pair of hub locks 36a and 36b are mounted to each hub of the front road wheels FWa and FWb to be locked when a four-wheel drive mode is selected at the transfer device 24 and to be unlocked when a two-wheel drive mode is selected at the transfer device 24. When locked, the hub locks 36a and 36b act to connect the front road wheels FWa and FWb to the split axle parts 35a and 35b. When unlocked, the hub locks 36a and 36b act to disconnect the front road wheels FWa and FWb from the split axle parts 35a and 35b to eliminate back drive of the split axle parts 35a and 35b. The hub locks each may be in the form of a conventional hub lock to be manually locked or unlocked, or in the form of a conventional hub lock to be automatically locked or unlocked.

As shown in FIGS. 1 and 2, the vacuum motor 37 is attached to the transfer housing 24b in an appropriate manner, which includes a diaphragm piston 37a assembled within a motor housing to subdivide the interior of the motor housing into front and rear chambers 37b and 37c. An operation rod 37d is connected at its rear end to the diaphragm piston 37a and at its front end to the clutch sleeve 24e to effect shifting movement of the clutch sleeve 24e in response to forward or backward movement of the diaphragm piston 37a. The chambers 37b and 37c of motor 37 are connected to electrically operated switchover valves 38 and 39 (VSV$_1$, VSV$_2$) through conduits P$_1$ and P$_2$, respectively.

As shown in FIGS. 1 and 2, the switchover valve 38 is in the form of an electromagnetic valve 38a which is provided with a port 38c in open communication with the atmospheric air, a port 38d connected to the conduit P$_1$, and a port 38e connected to a conduit P$_3$. The switchover valve 38 is arranged to be switched over from a first position to a second position by energization of its associated solenoid 38b. During deenergization of the solenoid 38b, the switchover valve 38 is maintained in the first position to connect the conduit P$_1$ to the atmospheric air through ports 38d and 38c. When the solenoid 38b is energized, the switchover valve 38 is switched over from the first position to the second position to disconnect the conduit P$_1$ from the port 38c and connect it to the conduit P$_3$ through ports 38d and 38e. Similarly, the switchover valve 39 is in the form of an electromagnetic valve 39a which is provided with a port 39c in open communication with the atmospheric air, a port 39d connected to the conduit P$_2$, and a port 39e connected to the conduit P$_3$. The switchover valve 39 is arranged to be switched over from a first position to a second position by energization of its associated solenoid 39b. During deenergization of the solenoid 39b, the switchover valve 39 is maintained in the first position to connect the conduit P$_2$ to the atmospheric air through ports 39d and 39c. When the solenoid 39b is energized, the switchover valve 39 is switched over from the first position to the second position to disconnect the conduit P$_2$ from the port 39c and connect it to the conduit P$_3$ through ports 39d and 39e. As shown in FIG. 1, the conduit P$_3$ is connected to an intake manifold of engine 21 to be supplied with a negative pressure in operation of the engine 21. Disposed within the conduit P$_3$ are a vacuum tank 41 for maintaining the negative pressure in conduit P$_3$ in a predetermined value and a check valve 42 for interrupting the flow of air into the intake manifold.

As shown in FIGS. 1 and 2, an electric control apparatus 50 for the transfer device 24 includes a detection switch 51, rotational speed sensors 52, 53, a manual operation switch of the momentary contact type 54, and a microcomputer 55. The detection switch 51 is in the form of a normally open switch contained within a switch assembly 51a which is mounted on the transfer housing 24b and arranged to face the clutch sleeve 24e. Thus, the switch 51 is maintained in its open position when the clutch sleeve 24e is in the first position and is closed by engagement with a projection 24e$_1$ of clutch sleeve 24e when it is shifted to and maintained in the second position as shown by dotted lines in the figure. The detection switch 51 has a movable contact connected to the ground and a fixed contact connected to an electric power source in the form of a vehicle battery 66 through a diode Di, an indication lamp 56 and an ignition switch 65 of the engine 21. The indication lamp 56 is housed within an indicator 62 which is located below a speedometer 61 on an instrument panel 60 of the vehicle. The indicator 62 indicates a character "4WD" thereon when the lamp 56 is lighted. The fixed contact of switch 51 is further connected to the microcomputer 55 through a resistor r$_1$ so that the computer 55 is applied with a high level signal from switch 51 when it is being opened and applied with a low level signal from switch 51 when it is being closed. A junction between the resistor r$_1$ and computer 55 is connected to a collector of a switching transistor 57 which is grounded at its emitter and connected at its base to the computer 55 to be turned on or off in response to a control signal applied thereto from the computer 55. Arranged in parallel with the indication lamp 56 and diode Di is a resistor r$_2$ which acts to apply the electric power to the fixed contact of switch 51 even when the lamp 56 is disconnected or damaged.

The rotational speed sensor 52 includes a pick-up coil L$_1$ contained within a sensor assembly 52a which is mounted on the transfer housing 24b and arranged to face a rotary disc 24i with a permanent magnet mounted on the input shaft 24a for rotation therewith. The pick-up coil L$_1$ is excited by rotation of the rotary disc 24i to produce a pick-up signal at a frequency proportional to the rotational speed of input shaft 24a. The pick-up coil L$_1$ is connected to a wave shaper 52b which acts to reshape the pick-up signal into a rectangular wave signal and apply it to the computer 55. Similarly, the rotational speed sensor 53 includes a pick-up coil L$_2$ contained within a sensor assembly 53a which is mounted on the transfer housing 24b and arranged to face a rotary disc 24j with a permanent magnet mounted on the output shaft 24f for rotation therewith. The pick-up coil L$_2$ is excited by rotation of the rotary disc 24j to produce a pick-up signal at a frequency proportional to the rotational speed of output shaft 24f. The pick-up coil L$_2$ is connected to a wave shaper 53b which acts to reshape the pick-up signal into a rectangular wave signal and apply it to the computer 55.

The operation manual switch 54 is in the form of a normally open switch of the momentary type which is arranged to be closed by depression of a push button 63 on the instrument panel 60. The operation switch 54 has a fixed contact connected to the electric power source 66 and another fixed contact grounded through a resistor $r_3$ and connected to the computer 55. When maintained in its open position, the operation switch 54 produces a low level signal therefrom and applies it to the computer 55. When closed, the operation switch 54 produces a high level signal therefrom and applies it to the computer 55. Arranged in parallel with the operation switch 54 and resistor $r_3$ is a series circuit including an indication lamp 58, a resistor $r_4$ and a switching transistor 59. The lamp 58 is contained within an indicator 64 which is arranged above the push button 63 on the instrument panel 60. The indicator 64 indicates the mode of operation of the transfer device 24 at each time when the lamp 58 is turned on or off by depression of the push button 63. The transistor 59 is connected at its base to the computer 55 to be turned on or off in response to a control signal applied thereto from the computer 55.

The computer 55 includes a read-only memory or ROM 55a, a central processing unit or CPU 55b, a random access memory or RAM 55c and an input-output device or I/O 55d which are connected to each other by means of bus lines 55e. The ROM 55a is arranged to memorize a program represented by flow charts shown in FIGS. 3 to 6. The CPU 55b is arranged to initiate execution of the program when the ignition switch 65 is closed and to produce control signals indicative of the mode of operation of the transfer device 24 during repetitive execution of the program. The RAM 55c is arranged to temporarily memorize data necessary for execution of the program. The I/O 55d includes a format converter $55d_1$ and a register $55d_2$, which is connected to driving circuits 38f and 39f.

A main part of the data is listed below.

DTSW . . . Data indicative of the condition of detection switch 51 which is defined by "0" when the switch 51 is turned on and is defined by "1" when the switch is turned off.

$OPSW_{new}$ . . . Data indicative of the present condition of operation switch 54 which is defined by "0" when the switch 54 is turned off and is defined by "1" when the switch 54 is turned on.

$OPSW_{old}$ . . . Data indicative of the prior condition of operation switch 54 which is defined by "0" when the switch 54 was turned off and is defined by "1" when the switch 54 was turned on.

Nr . . . Data indicative of the rotational speed of input shaft 24a and rear propeller shaft 26.

Nf . . . Data indicative of the rotational speed of output shaft 24f and front propeller shaft 32.

$LPFLG_1$ . . . First flag indicative of the condition of lamps 56 and 58 which is defined by "0" when the lamps 56 and 58 are being maintained in their energized or deenergized conditions and is defined by "1" when the lamps 56 and 58 are being intermittently energized.

$LPFLG_2$ . . . Second flag defined by "0" when the lamps 56 and 58 are being energized and defined by "1" when the lamps 56 and 58 are being deenergized.

$TIME_1$ . . . Data indicative of a lapse of time after start of deenergization of the lamps 56 and 58 or after start of energization of the lamps 56 and 58.

$TIME_2$ . . . Data indicative of a lapse of time after start of intermittent energization of the lamps 56 and 58.

Hereinafter, the operation of the computer 55 will be described in detail with reference to the flow charts shown in FIGS. 3 to 6. Assuming that the ignition switch 65 is maintained in its open position, the switchover valves 38 and 39 are maintained in their deenergized condition to connect the ports 38c, 39c to the ports 38d, 39d, respectively. In this condition, the chambers 37b and 37c of vacuum motor 37 are applied with the atmospheric pressure through the switchover valves 38 and 39. Accordingly, the diaphragm piston 37a of vacuum motor 37 is maintained in a position defined by the prior mode of operation of the transfer device 24.

Figure 3:
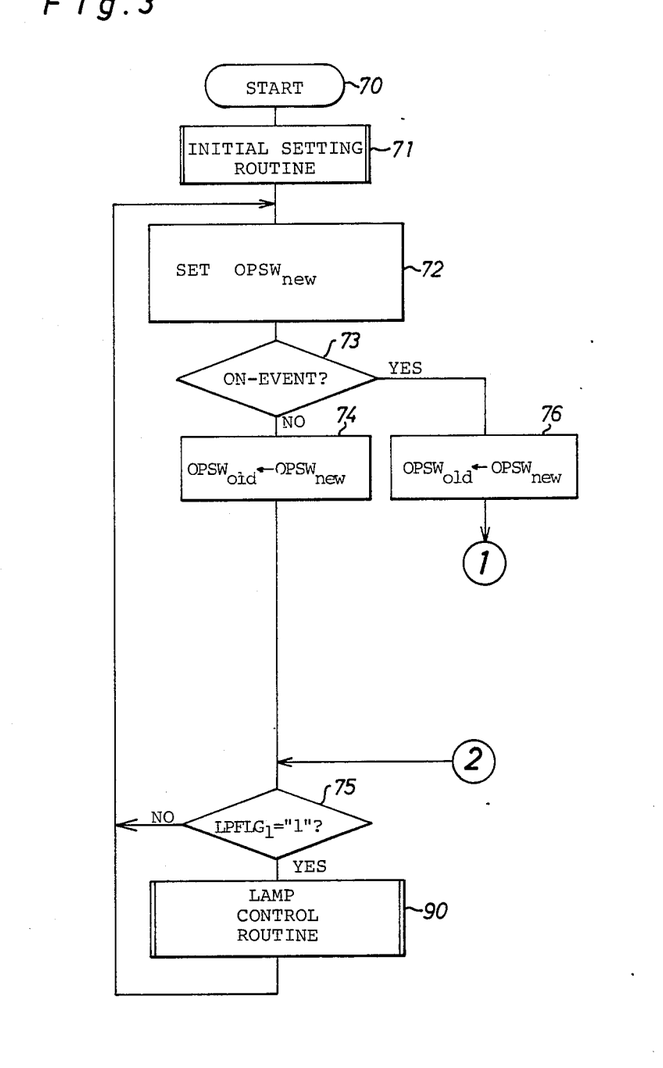
FIGS. 3 and 4 is a flow chart illustrating a program for a microcomputer in the electric control apparatus.
Figure 5:
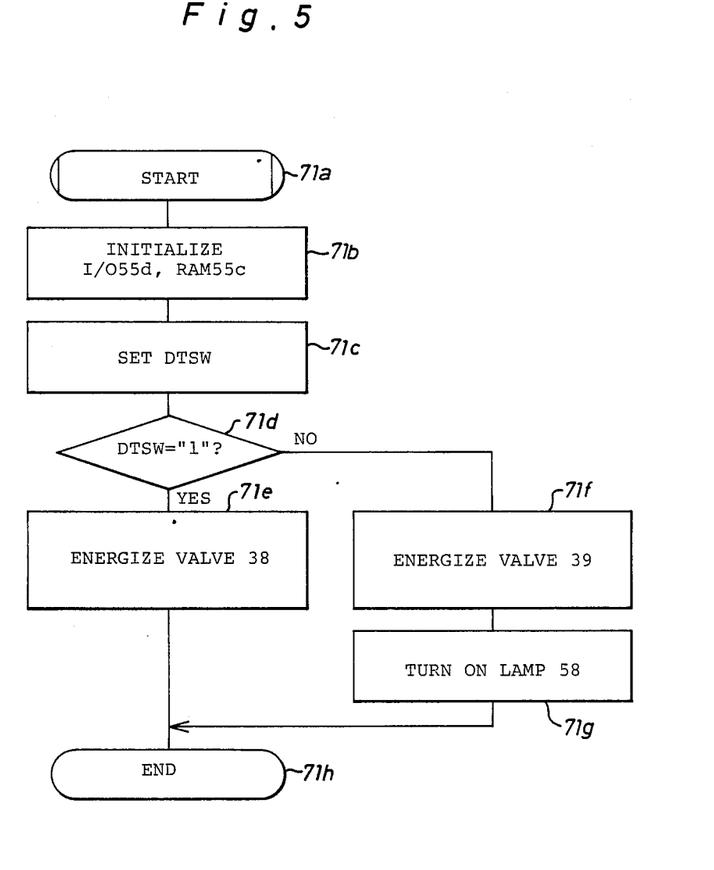
FIG. 5 is a flow chart of an initial setting routine shown in FIG. 3.

When the ignition switch 65 is closed to start the engine 21, the electric control system 50 is activated by supply of the electric power from the power source 66, and in turn the CPU 55b of computer 55 starts to execute the program at step 70 in the flow chart of FIG. 3. When the program proceeds to an initial setting routine 71, as shown in FIG. 5, the CPU starts at step 71a to clear all the data memorized in the register $55d_2$ of I/O 55d and the RAM 55c at step 71b. Thus, the transistors 57 and 59 are turned off by initialization of the I/O 55d to maintain the driving circuits 38f and 39f in their deenergized conditions and to maintain the switchover valves 38 and 39 in their first positions. At the following step 71c, the CPU 55b reads out the data DTSW indicative of the condition of detection switch 51 through the resistor $r_1$ and I/O 55d to set the data DTSW as "0" or "1". Assuming that the diaphragm piston 37a of vacuum motor 37 is positioned to retain the clutch sleeve 24e in the first position after prior operation of the transfer device 24 in the two-wheel drive mode, the detection switch 51 is maintained in its open position. In such a condition, the data DTSW is set as "1". If the diaphragm piston 37a of vacuum motor 37 is positioned to retain the clutch sleeve 24e in the second position after prior operation of the transfer device 24 in the four-wheel drive mode, the detection switch 51 is maintained in its closed position. In such a condition, the data DTSW is set as "0".

When the program proceeds to step 71d, the CPU 55b determines as to whether the data DTSW is set as "1" or not. If the answer is "Yes", the program will proceed to step 71e where the CPU 55b applies a control data for energization of the driving circuit 38f to the I/O 55d. The I/O 55d memorizes the control data in its register $55d_2$ to produce a control signal therefrom and apply it to the driving circuit 38f. Upon energization of the driving circuit 38f, the switchover valve 38 is switched over from the first position to the second position to provide communication between the ports 38d and 38e. In such a condition, the chamber 37b of vacuum motor 37 is applied with a negative pressure from the intake manifold of engine 21 through the conduits $P_3$ and $P_1$, while the switchover valve 39 is maintained in the first position to communicate the chamber 37c of vacuum motor 37 with the atmospheric air. Thus, the diaphragm piston 37a of vacuum motor 37 is moved by the difference in pressure between the chambers 37b and 37c to shift the clutch sleeve 24e toward the first position thereby to maintain the prior mode of operation of the transfer device 24.

If the answer is "No" at step 71d of the initial setting routine, the program will proceed to step 71f where the CPU 55b applies a control data for energization of the driving circuit 39f to the I/O 55d. The I/O 55d memorizes the control data in its register $55d_2$ to produce a control signal therefrom and apply it to the driving circuit 39f. Upon energization of the driving circuit 39f, the switchover valve 39 is switched over from the first position to the second position to provide communication between the ports 39d and 39e. In such a condition, the chamber 37c of vacuum motor 37 is applied with the negative pressure from the intake manifold of engine 21 through the conduits P₂ and P₃, while the switchover valve 38 is maintained in the first position to communicate the chamber 37b of vacuum motor 37 with the atmospheric air. Thus, the diaphragm piston 37a of vacuum motor 37 is moved by the difference in pressure between the chambers 37b and 37c to shift the clutch sleeve 24e toward the second position thereby to maintain the prior mode of operation of the transfer device 24. Subsequently, the program proceeds to step 71g where the CPU 55b applies a control data for energization of the transistor 59 to the I/O 55d. The I/O 55d memorizes the control data in its register 55d₂ to produce a control signal therefrom and apply it to the transistor 59. As a result, the lamp 58 is lighted by energization of the transistor 59, while the lamp 56 is lighted by closing of the detection switch 51.

From the above description, it will be understood that the execution of the initial setting routine 71 is effective to activate the vacuum motor 37 under control of the switchover valves 38, 39 so as to retain the clutch sleeve 24e in the first or second position without casing undesired vibration thereof during travel of the vehicle.

When the CPU 55b finishes the initial setting routine at step 71h, the program proceeds to step 72 of FIG. 3 where the CPU 55b reads out the data OPSW$_{new}$ indicative of the present condition of operation switch 54 through the I/O 55d to set the data OPSW$_{new}$ as "0". At the following step 73, the CPU 55b determines on-event of the operation switch 54 based on comparison of the data OPSW$_{old}$ and OPSW$_{new}$. As the data OPSW$_{old}$ and OPSW$_{new}$ each have been previously set as "0" at steps 71 and 72, the CPU 55b determines a "No" answer at step 73 and causes the program to proceed to step 74. At step 74, the CPU 55b renews the data OPSW$_{old}$ for the data OPSW$_{new}$ and causes the program to proceed to step 75 where the CPU 55b determines as to whether the first flag LPFLG₁ is "1" or not. As the first flag LPFLG₁ has been previously set as "0" at step 71b of the initial setting routine 71, the CPU 55b determines a "No" answer at step 75 and returns the program to step 72. Thereafter, the CPU 55b will repeat the execution of processing at steps 72 to 75.

Assuming that the clutch sleeve 24e is maintained in the first position during travel of the vehicle, the power applied to the input shaft 24a of transfer device 24 is transferred to the rear road wheels RWa and RWb through the rear propeller shaft 26, differential 28 and split axle parts 29a, 29b. This establishes a two-wheel drive mode of the vehicle. Assuming that the clutch sleeve 24e is maintained in the second position during travel of the vehicle and that the hub locks 36a, 36b are locked, the power applied to the input shaft 24a of transfer device 24 is transferred to the rear road wheels RWa and RWb through the rear propeller shaft 26, differential 28 and split axle parts 29a, 29b and is further transferred to the output shaft 24f through the clutch hubs 24d, 24c₁, drive sprocket 24c, chain 24h and driven sprocket 24g. Thus, the front road wheels FWa and FWb are applied with the power from output shaft 24f through the front propeller shaft 32, differential 34, split axle parts 35a, 35b and hub locks 36a, 36b. This establishes a four-wheel drive mode of the vehicle. The two-wheel drive mode or four-wheel drive mode is established after the execution of data processing at steps 71a to 71h of the initial setting routine 71. This means that the established drive mode corresponds with the prior mode of operation of the transfer device 24. Accordingly, the driver can drive the vehicle with the same feel as that in his prior driving.

When the push button 63 is depressed by the driver to turn on the operation switch 54 during repetitive execution of the processing at steps 72 to 75, the data OPSW$_{new}$ is set as "1" at step 72, while the data OPSW$_{old}$ is maintained as "0". Thus, the CPU 55b determines a "Yes" answer at step 73 and causes the program to proceed to step 76 where the CPU 55b renews the data OPSW$_{old}$ for the data OPSW$_{new}$. When the program proceeds to step 77 of FIG. 4, the CPU 55b determines as to whether the first flag LPFLG₁ is "0" or not. As the first flage LPFLG₁ has been previously set as "0" at step 71b of the initial setting routine 71, the CPU 55b determines a "Yes" answer at step 77 and causes the program to proceed to step 78. At step 78, the CPU 55b reads out the data DTSW to set the same in accordance with the condition of detection switch 51 and causes the program to proceed to step 79 where the CPU 55b determines as to whether the data DTSW is "1" or not.

Assuming that the two-wheel drive mode is selected at the transfer device 24 to maintain the detection switch 51 in its open position, the CPU 55b determines a "Yes" answer at step 79 and causes the program to proceed to step 80. At step 80, the CPU 55b reads out the data Nr indicative of the rotational speed of input shaft 24a from sensor 52 through the wave shaper 52b and I/O 55d to calculate the rotational speed of input shaft 24a or rear propeller shaft 26. At the following step 81, the CPU 55b determines as to whether or not the calculated rotational speed is equal to or more than that corresponding to a vehicle speed of 10 km/h. If the vehicle is stopping or travelling at a lower speed than 10 km/h, the CPU 55b determines a "No" answer and causes the program to proceed to step 84. If the vehicle is travelling at a high speed equal to or more than 10 km/h, the CPU 55b determines a "Yes" answer at step 81 and causes the program to proceed to step 82. At step 82, the CPU 55b reads out the data Nf indicative of the rotational speed of output shaft 24f from sensor 53 through the wave shaper 53b and I/O 55d to calculate the rotational speed of output shaft 24f or front propeller shaft 32. At the following step 83, the CPU 55b determines as to whether or not the calculated rotational speed is equal to or more than that corresponding to the vehicle speed of 10 km/h. If the hub locks 36a, 36b are being unlocked to still the output shaft 24f, front propeller shaft 32, differential 34 and split axle parts 35a, 35b during travel of the vehicle in the two-wheel drive mode, the CPU 55b will determine a "No" answer at step 83 and will cause the program to proceed to step 87. If the hub locks 36a are being locked to effect back drive of the split axle parts 35a, 35b, differential 34, front propeller shaft 32 and output shaft 24f during travel of the vehicle in the two-wheel drive mode, the CPU 55b will determine a "Yes" answer at step 83 and will cause the program to proceed to step 84.

At step 84, the CPU 55b produces therefrom control data for deenergization of the driving circuit 38f and for energization of the driving circuit 39f to apply them to the I/O 55d. Thus, the I/O 55d memorizes the control data in its register 55d₂ to produce control signals therefrom and apply them to the driving circuits 38f and 39f. Thus, the driving circuit 38f is deenergized to switch over the switchover valve 38 from the second position to the first position, while the driving circuit 39f is energized to switch over the switchover valve 39 from the first position to the second position. As a result, the chamber 37b of vacuum motor 37 is communicated with the atmospheric air through the conduit P , while the chamber 37c of vacuum motor 37 is applied with the negative pressure from the intake manifold of engine 21 through the conduits $P_3$ and $P_2$. In turn, the diaphragm piston 37a of vacuum motor 37 is moved backwards by the difference in pressure between chambers 37b and 37c to shift the clutch sleeve 24e from the first position to the second position. Thus, the mode of operation of the transfer device 24 is switched over from the two-wheel drive mode to the four-wheel drive mode.

In the four-wheel drive mode of the transfer device 24, the detection switch 51 is closed by engagement with the projection $24e_1$ of clutch sleeve 24e to energize the lamp 56 so as to indicate the character "4WD" on the indicator 62. When the program proceeds to step 85 after the execution of processing at step 84, the CPU 55b executes the same processing as that at step 71g to energize the lamp 58 and sets the first flag $LPFLG_1$ as "0" at the following step 86. Subsequently, the CPU 55b determines a "No" answer at step 75 of FIG. 3 to return the program to step 72.

When the push button 63 is continually depressed to maintain the operation switch 54 in its closed position, the data $OPSW_{new}$ is set as "1" by processing at step 72, while the data $OPSW_{old}$ is being set as "1" by the previous processing at step 76. In this condition, the CPU 55b determines a "No" answer at step 73 and causes the program to proceed to steps 74 and 75. As a result, the processing at steps 72 to 75 is repeatedly executed. When the push button 63 is released during the repetitive execution of the processing at steps 72 to 75, the data $OPSW_{new}$ is set as "0" by processing at step 72 but the CPU 55b determines a "No" answer at step 73 since the data $OPSW_{old}$ has been set as "1" by the previous processing at step 74. As a result, the processing at steps 72 to 75 will be repeatedly executed, and the data $OPSW_{old}$ will be set as "0" at step 74.

Figure 4:
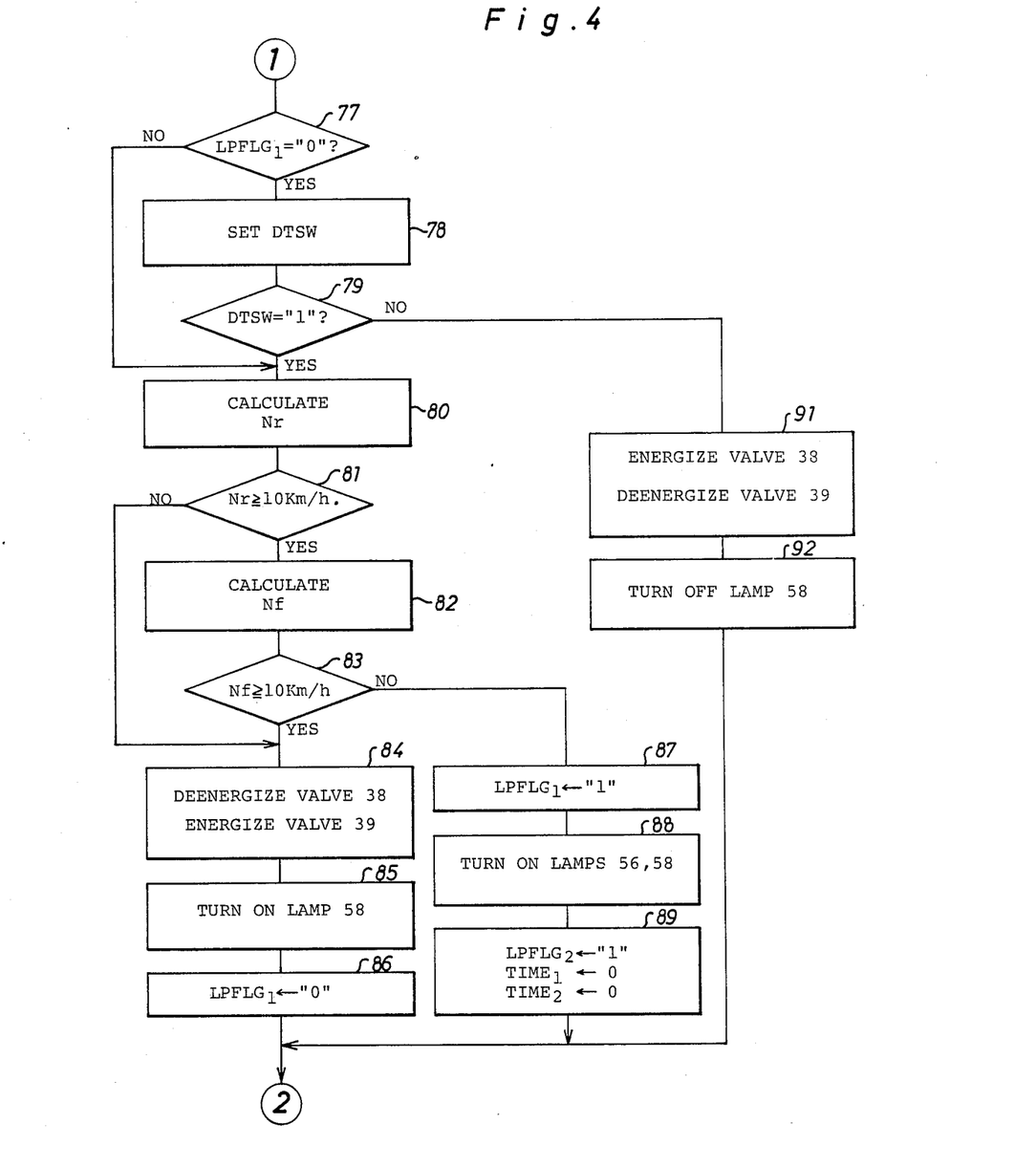

When the CPU 55b determines a "No" answer at step 83 of FIG. 4 during the processing described above, the program proceeds to step 87 where the CPU 55b sets the first flag $LPFLG_1$ as "1". Subsequently, the CPU 55b produces therefrom control data for energization of the transistors 57 and 59 at step 88 to apply the control data to the I/O 55d. The I/O 55d memorizes the control data in its register $55d_2$ and applies control signals to the transistors 57 and 59. Thus, the transistors 57 and 59 are turned on to energize the lamps 56 and 58. After the processing at step 88, the program proceeds to step 89 where the CPU 55b sets the second flag $LPFLG_2$ as "1" and sets the first and second timer data $TIME_1$ and $TIME_2$ as "0", respectively. Subsequently, the CPU 55b determines as to whether the first flag $LPFLG_1$ is "1" or not. In this instance, the CPU 55b determines a "Yes" answer and causes the program to proceed to a lamp control routine 90.

Figure 6:
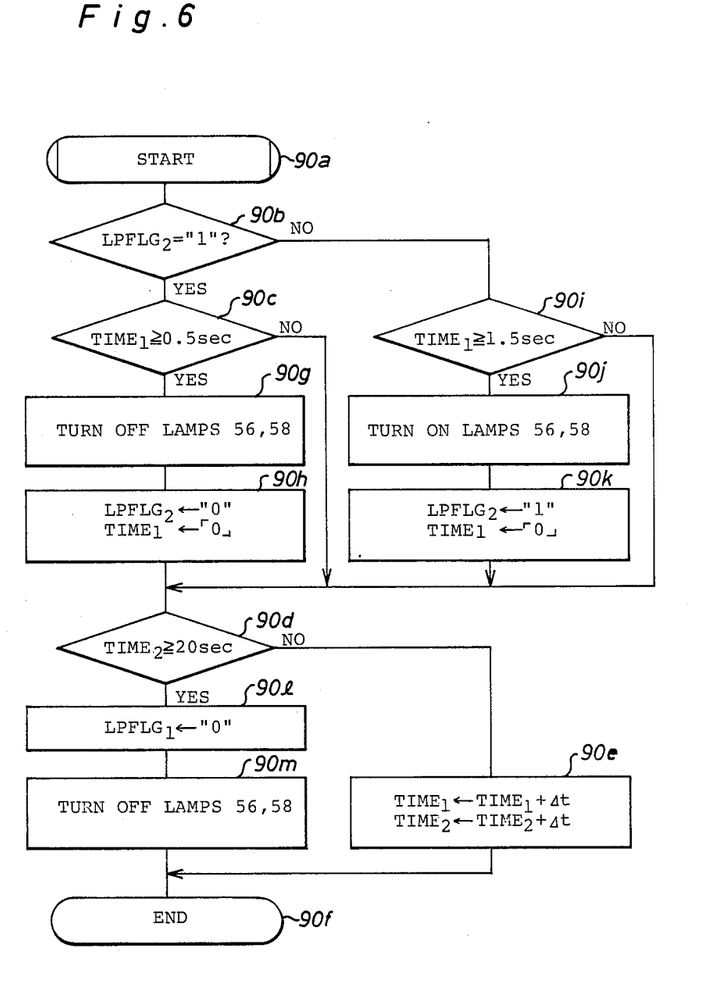
FIG. 6 is a flow chart of a lamp control routine shown in FIG. 3.

As shown in FIG. 6, the CPU 55b starts at step 90a to execute the lamp control routine 90 and determines at step 90b as to whether the second flag $LPFLG_2$ is "1" or not. As the second flag $LPFLG_2$ has been previously set as "1" at step 89, the CPU 55b determines a "Yes" answer and causes the program to proceed to step 90c where the CPU 55b determines as to whether or not the first timer data $TIME_1$ is equal to or more than a value indicative of 0.5 second. As the first timer data $TIME_1$ has been previously set as "0" at step 89, the CPU 55b determines a "No" answer and causes the program to proceed to step 90d where the CPU 55b determines as to whether or not the second timer data $TIME_2$ is equal to or more than a value indicative of 20 second. As the second timer data $TIME_2$ has been previously set as "0" at step 89, the CPU 55b determines a "No" answer and causes the program to proceed to step 90e where the CPU 55 add a time data $\Delta t$ to the first and second timer data $TIME_1$ and $TIME_2$ respectively to renew the timer data $TIME_1$ and $TIME_2$ with the added values $TIME_1 + \Delta t$ and $TIME_2 + \Delta t$. When finished the first execution of the lamp control routine at step 90f, the CPU 55b returns the program to step 72 to repeat the processing at steps 72 to 75. In this embodiment, the time data $\Delta t$ is defined by a time necessary for the processing at steps 72 to 75 and steps 90a to 90f.

As the first flag $LPFLG_1$ is being maintained as "1", the CPU 55b determines again a "Yes" answer at step 75 and causes the program to proceed to the lamp control routine 90. In this instance, the second flag $LPFLG_2$ is also being maintained as "1", and the timer data $TIME_1$ and $TIME_2$ are being maintained as "$TIME_1 + \Delta t$" and "$TIME_2 + \Delta t$", respectively. Accordingly, the CPU 55b determines a "Yes" answer at step 90b, a "No" answer at step 90c and a "No" answer at step 90d and causes the program to proceed to step 90e. At step 90e, the CPU 55b further add the time data $\Delta t$ to the previously added values $TIME_1 + \Delta t$ and $TIME_2 + \Delta t$ to renew the latter with the newly added values $TIME_1 + 2\Delta t$ and $TIME_2 + 2\Delta t$. When finished the second execution of the lamp control routine at step 90f, the CPU 55b returns the program to step 72 to further repeat the processing at steps 72 to 75 and steps 90a to 90f to increase the values of timer data $TIME_1$ and $TIME_2$.

After the processing at steps 72 to 75 and steps 90a to 90f has been repeated for 0.5 second, the CPU 55b determines a "Yes" answer at step 90c and causes the program to proceed to step 90g where the CPU 55b produces therefrom control data for deenergization of transistors 57 and 59 to apply them to the I/O 55d. Thus, the I/O 55d memorizes the control data in its register $55d_2$ to produce control signals therefrom and apply them to the transistors 57 and 59. Thus, the transistors 57 and 59 are deenergized to turn off the lamps 56 and 58. Subsequently, the CPU 55b sets the second flag $LPFLG_2$ and the first timer data $TIME_1$ as "0" respectively at step 90h and executes the processing at steps 90d, 90e and 90f in the same manner as described above. In this instance, the value of timer data $TIME_1$ is increased from "0" by the processing at steps 90h and 90e, while the value of timer data $TIME_2$ is continuously increased by the processing at step 90e.

After the execution of the lamp control routine 90, the CPU 55b further executes the processing at steps 72 to 75 and the lamp control routine 90. During the further execution, the CPU 55b determines a "No" answer at step 90b and causes the program to proceed to step 90i where the CPU 55b determines as to whether or not the value of timer data $TIME_1$ is equal to or more than a value indicative of 1.5 second. If the answer is "No", the CPU 55b will execute the processing at steps 90d to 90f, steps 72 to 75 and steps 90a, 90b, 90i in the same manner as described above. If the answer is "Yes" at step 90i, the CPU 55b causes the program to proceed to step 90j where the CPU 55 executes the same processing as that at step 88 to turn on the lamps 56 and 58. At the following step 90k, the CPU 55b sets the second flag LPFLG$_2$ as "1" and the first timer data TIME$_1$ as "0" and further executes the processing at steps 90d to 90f. Thereafter, the CPU 55b will alternately execute the processing at step 90g or 90j to effect intermittent energization of the lamps 56 and 58. Thus, the lamps 56 and 58 are turned on for 0.5 second and turned off for 1.5 second.

Assuming that the lamps 56 and 58 have been intermittently energized for 20 second, the CPU 55b determines a "Yes" answer at step 90d and causes the program to proceed to step 90l. At step 90l, the CPU 55b sets the first flag LPFLG$_1$ as "0" and causes the program to proceed to step 90m where the CPU 55b executes the same processing as that at step 90g to deenergize the transistors 57 and 59 and to turn off the lamps 56 and 58. The processing at step 90m is useful to detect the on-off condition of detection switch 51 under deenergized condition of the transistor 57. Thereafter, the CPU 55b causes the program to proceed to step 72 through step 90f and executes the processing at steps 72 to 75. In this instance, the CPU 55b determines a "No" answer at step 75 and repeats the execution of the processing at steps 72 to 75.

When the push button 63 is depressed in a condition where the lamps 56 and 58 are being turned on and off, the CPU 55b determines a "Yes" answer at step 73 duing repetitive execution of the data processing at steps 72 to 75 and steps 90a to 90f and causes the program to proceed to step 77 through step 76. In this instance, the CPU 55b determines as to whether the first flag LPFLG$_1$ is "0" or not at step 77. As the first flag LPFLG$_1$ has been previously set as "1" at step 87, the CPU 55b determines a "No" answer and causes the program to proceed to steps 80 to 83. If the CPU 55b determines a "No" answer at step 81 or a "Yes" answer at step 83, it will execute the processing at steps 84 and 85 to switch over the mode of operation of the transfer device 24 from the two-wheel drive mode to the four-wheel drive mode and to turn on the lamp 58 in the same manner as described above. At the following step 86, the CPU 55b sets the first flag LPFLG$_1$ as "0" and executes the processing at steps 72 to 75. If the CPU 55b determines a "Yes" answer at step 81 and a "No" answer at step 83, it will execute the processing at steps 87 to 89 and will repeat the execution of the processing at steps 72 to 75 and 90a to 90f to maintain the transfer device 24 in the two-wheel drive mode and to intermittently energize the lamps 56 and 58. In this instance, the second timer data TIME$_2$ is set as "0" by the processing at step 89. Accordingly, the intermittent energization of lamps 56 and 58 will continue for 20 second after the depression of push button 63.

From the above description, it will be understood that the processing at steps 80 to 83 is effective to prohibit switchover of the transfer device 24 from the two-wheel drive mode to the four-wheel drive mode in a condition where the hub locks 36a, 36b are unlocked during travel of the vehicle at a higher speed than 10 km/h. This is useful to eliminate the occurrence of unpleasant noises caused by drive connection between the clutch hubs 24d and 24c$_1$ during high speed travel of the vehicle and to prevent the clutch hubs 24d, 24c$_1$ and clutch sleeve 24e from unexpected damage. Additionally, the processing at steps 87 to 89 and 90a to 90m is effective to intermittently energize the lamps 56 and 58. This is useful to visually inform the driver the fact that switchover to the four-wheel drive mode is prohibited.

Furthermore, the processing at steps 72 to 74 and 76 is effective to detect an operated condition of the self-return type switch 54 associated with the push button 63 so as to determine as to whether the switchover to the four-wheel drive mode is permitted or not. This is useful to avoid unexpected switchover to the four-wheel drive mode caused by change of the vehicle speed after operation of the push button 63 and to ensure safety drive of the vehicle. In a condition where the lamps 56 and 58 are being intermittently energized to inform the driver of the fact that switchover to the four-wheel drive mode was prohibited, the processing at steps 72 to 77 may be executed by depression of the push button 63 to determine as to whether the switchover to the four-wheel drive mode is permitted or not. This enables the driver to switch over the transfer device to the four-wheel drive mode at any time so far as the switchover is permitted. In a condition where the rotational speed of clutch hub 24d is approximately equal to that of clutch hub 24c$_1$ under locked condition of the hub locks 36a, 36b or the difference in rotational speed between the clutch hubs 24d and 24c$_1$ is small during travel of the vehicle at a lower speed than 10 km/h, the switchover to the four-wheel drive mode is always permitted by the processing at steps 80 to 83 to fully effect the function of the part-time four-wheel drive vehicle.

Assuming that the push button 63 is depressed in a condition where the four-wheel drive mode is selected at the transfer device, the CPU 55b determines a "Yes" answer at step 73 during the processing at steps 72 to 75 and causes the program to proceed to step 77 where the CPU 55b determines as to whether or not the first flag LPFLG$_1$ is "0". In this instance, the first flag LPFLG$_1$ is maintained as "0" during travel of the vehicle in the four-wheel drive mode. Thus, the CPU 55b determines a "Yes" answer at step 77 and causes the program to proceed to steps 78 and 79. At step 78, the CPU 55b sets the data DTSW in accordance with the condition of detection switch 51 to determine as to whether or not the data DTSW is "1" at step 79. In this instance, the detection switch 51 is being closed by engagement with the projection 24e$_1$ of clutch sleeve 24e. Accordingly, the CPU 55b sets the data DTSW as "0" at step 78, determines a "No" answer at step 79 and causes the program to proceed to step 91.

At step 91, the CPU produces therefrom control data for energization of the driving circuit 38f and for deenergization of the driving circuit 39f and applies them to the I/O 55d. The I/O 55d memorizes the control data in its register 55d$_2$ and produces therefrom control signals for energizing the driving circuit 38f and for deenergizing the driving circuit 39f. Thus, the driving circuit 38f is energized by the control signal applied thereto to switch over the switchover valve 38 from the first position to the second position, while the driving circuit 39f is deenergized by the control signal applied thereto to switch over the switchover valve 39 from the second position to the first position. As a result, the chamber 37b of vacuum motor 37 is applied with the negative pressure, while the chamber 37c of vacuum motor 37 is communicated with the atmospheric air. Thus, the diaphragm piston 37a of vacuum motor 37 is moved forwards by the difference in pressure between chambers 37b and 37c to shift the clutch sleeve 24e from the second position to the first position thereby to establish the two-wheel drive mode at the transfer device 24. In this instance, the detection switch 51 is opened by disengagement from the projection 24e$_1$ of clutch sleeve 24e to turn off the lamp 56. After the processing at step 91, the CPU 55b causes the program to proceed to step 92 where the CPU 55b produces therefrom control data for deenergization of the transistor 59 and applies it to the I/O 55d. The I/O 55d memorizes the control data in its register 55d₂ and applies a control signal to the transistor 59. Thus, the transistor 59 is deenergized to turn off the lamp 58.

When the ignition switch 65 is opened to stop the engine 21 in a condition where the two-wheel drive mode or the four-wheel drive mode is being selected at the transfer device 24, the electric control apparatus 50 is deactivated in such a manner that both the driving circuits 38f and 39f are deenergized. Thus, the switchover valves 38 and 39 each are maintained in the first position to communicate the chambers 37b and 37c of vacuum motor 37 with the atmospheric air, and the clutch sleeve 24e is maintained in its shifted position.

Having now fully set forth a preferred embodiment of the concept underlying the present invention, various other applications and embodiments as well as certain modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An electric control apparatus for a part-time four-wheel drive vehicle having a transfer device united with a power transmission and including an input shaft driven by the transmission, a first output shaft drivingly connected to the input shaft for continuously driving a first set of road wheels through a first propeller shaft, a second output shaft connectable to the input shaft and drivingly connected to a second set of road wheels through a second propeller shaft, and a clutch mechanism shiftable between a first position where it is disengaged to disconnect the second output shaft from the input shaft thereby to provide a two-wheel drive mode and a second position where it is engaged to connect the second output shaft to the input shaft thereby to provide a four-wheel drive mode, the electric control apparatus comprising:

a manual operation switch of the momentary contact type for selecting the two-wheel drive mode or the four-wheel drive mode at said transfer device;

switchover means arranged to be activated in response to operation of said operation switch for switching over said clutch mechanism from the first position to the second position;

first detecting means for detecting rotational speed of said first propeller shaft to produce a first speed signal indicative of the rotational speed of said first propeller shaft;

second detecting means for detecting rotational speed of said second propeller shaft to produce a second speed signal indicative of the rotational speed of said second propeller shaft;

third detecting means for detecting the position of said clutch mechanism to produce a position signal indicative of the position of said clutch mechanism; and control means responsive to operation of said operation switch, said speed signals and said position signal for permitting activation of said switchover means only when said operation switch is operated in a condition where said clutch mechanism is in the first position and where the rotational speed of said first propeller shaft is lower than a predetermined speed or in a condition where said clutch mechanism is in the first position and where the rotational speed of said second propeller shaft is substantially equal to the rotational speed of said first propeller shaft and for prohibiting activation of said switchover means in a condition where the rotational speed of said first propeller shaft is higher than the predetermined speed and where the rotational speed of said second propeller shaft is lower than the rotational speed of said first propeller shaft.

2. An electric control apparatus as claimed in claim 1, further comprising indication means for visually informing the driver of the fact that activation of said switchover means is prohibited under control of said control means.

3. An electric control apparatus as claimed in claim 1, wherein said control means is a microcomputer programmed to calculate rotational speed of said first and second propeller shafts in response to said speed signals and responsive to operation of said manual operation switch and said position signal for permitting activation of said switchover means only when said manual operation switch is operated in a condition where said clutch mechanism is in the first position and where the rotational speed of said first propeller shaft is lower than a predetermined speed or in a condition where said clutch mechanism is in the first position and where the rotational speed of said second propeller shaft is substantially equal to the rotational speed of said first propeller shaft and for prohibiting activation of said switchover means in a condition where the rotational speed of said first propeller shaft is higher than the predetermined speed and where the rotational speed of said second propeller shaft is lower than the rotational speed of said first propeller shaft.

4. An electric control apparatus as claimed in claim 2, wherein said indication means includes an indication lamp mounted on an instrument panel of the vehicle and means for intermittently energizing said lamp when the activation of said switchover means is prohibited under control of said control means.

5. An electric control apparatus for a parttime four-wheel drive vehicle having a transfer device united with a power transmission and including an input shaft driven by the transmission, a first output shaft drivingly connected to the input shaft for continuously driving a first set of road wheels through a first propeller shaft, a second output shaft connectable to the input shaft and drivingly connected to a second set of road wheels through a second propeller shaft, and a clutch mechanism shiftable between a first position where it is disengaged to disconnect the second output shaft from the input shaft thereby to provide a two-wheel drive mode and a second position where it is engaged to connect the second output shaft to the input shaft thereby to provide a four-wheel drive mode, the electric control apparatus comprising:

a manual operation switch of the momentary contact type for selecting the two-wheel drive mode or the four-wheel drive mode at said transfer device;

switchover means arranged to be activated in response to operation of said operation switch for switching over said clutch mechanism from the first position to the second position;

first detecting means for detecting rotational speed of said first propeller shaft to produce a speed signal indicative of the travel speed of the vehicle;

second detecting means for detecting the postion of said clutch mechanism to produce a position signal indicative of the position of said clutch mechanism; and control means responsive to operation of said operation switch and said speed signal for permitting activation of said switchover means only when said operation switch is operated in a condition where the travel speed of the vehicle is lower than a predetermined speed and for prohibiting activation of said switchover means in a condition where the travel speed of the vehicle is higher than the predetermined speed, said control means being arranged to memorize a position defined by prior operation of said transfer device and being further responsive to start of a prime mover of the vehicle and said position signal for activating said switchover means in such manner as to retain said clutch mechanism in the memorized position.

6. An electric control apparatus as claimed in claim 5, wherein control means is a microcomputer programmed to calculate the travel speed of the vehicle in response to said speed signal and responsive to operation of said manual operation switch for permitting activation of said switchover means only when said manual operation switch is operated in a condition where the travel speed of the vehicle is lower than a predetermined speed for prohibiting activation of said switchover means in a condition where the travel speed of the vehicle is higher than the predetermined speed, said microcomputer being arranged to memorize a position defined by prior operation of said transfer device and being responsive to start of a prime mover of the vehicle and said position signal for activating said switchover means in such a manner as to retain said clutch mechanism in the memorized position.

* * * * *